(12) United States Patent
Kay et al.

(10) Patent No.: US 11,860,105 B2
(45) Date of Patent: Jan. 2, 2024

(54) RAMAN SPECTROMETER

(71) Applicant: K2R2 LLC, Camarillo, CA (US)

(72) Inventors: Robert L Kay, Thousand Oaks, CA (US); Graham Ross, Oceanside, CA (US)

(73) Assignee: K2R2, Camarillo, CA (US)

( * ) Notice: Subject to any disclaimer, the term of this patent is extended or adjusted under 35 U.S.C. 154(b) by 0 days.

(21) Appl. No.: 18/118,901

(22) Filed: Mar. 8, 2023

(65) Prior Publication Data
US 2023/0243751 A1 Aug. 3, 2023

Related U.S. Application Data

(63) Continuation of application No. 17/395,814, filed on Aug. 6, 2021, now Pat. No. 11,619,588.

(60) Provisional application No. 63/105,763, filed on Oct. 26, 2020.

(51) Int. Cl.
G01J 3/44 (2006.01)
G01N 21/65 (2006.01)

(52) U.S. Cl.
CPC .............. G01N 21/65 (2013.01); G01J 3/44 (2013.01); G01N 2201/0221 (2013.01)

(58) Field of Classification Search
CPC ........ G01J 3/44; G01J 3/02; G01J 3/28; G01J 3/00; A61B 5/007; G01N 21/65; G01N 2201/0221; G01N 2021/651
See application file for complete search history.

(56) References Cited

U.S. PATENT DOCUMENTS

2011/0101243 A1* 5/2011 Wimberger-Friedl ...................... G01N 21/6452 250/459.1
2013/0008610 A1* 1/2013 Jiang ................. C23C 16/45508 156/345.55
2015/0253250 A1* 9/2015 Noda ..................... G01N 21/76 422/52

* cited by examiner

Primary Examiner — Abdullahi Nur

(57) ABSTRACT

An apparatus for analysis of a sample of a material is disclosed. The apparatus has a body configured to accept the sample and a detector with a plurality of points. The detector is configured to provide a signal about the intensities of light received at the points. The apparatus also includes a slit array having a plurality of slits configured to collected light from the accepted sample and a collimating lens array having a plurality of lenses configured to receive the light from the slit array and collimate the collected light. The apparatus also includes a diffraction grating configured to diffract the light received from the collimating lens array and a focusing lens configured to focus the diffracted light of a common frequency on a common point of the detector.

13 Claims, 8 Drawing Sheets

RAMAN SPECTROMETER

CROSS-REFERENCE TO RELATED APPLICATIONS

This Continuation application claims the benefit of U.S. application Ser. No. 17/395,814 filed Aug. 6, 2021 and currently pending, the entirety of which is incorporated herein by reference.

STATEMENT REGARDING FEDERALLY SPONSORED RESEARCH OR DEVELOPMENT

Not applicable.

BACKGROUND

Field

The present invention generally relates to the use of Raman spectroscopy to identify attributes of a material.

Description of the Related Art

Raman spectroscopy, named after Indian physicist C. V. Raman, is a spectroscopic technique used to identify materials. A source of monochromatic light illuminates a sample. The photons of the source light excite the molecules of the sample, which then emit photons that will be at a higher or lower energy level, compared to the incident photons, depending on the vibrational modes of the molecules of the sample. Every molecule has a characteristic "fingerprint" based on its structure. Comparison of the results generated by a sample to a library of material fingerprints enables the determination of the materials in the sample.

Conventional Raman spectrometers suffer from a number of drawbacks including a limited Field of View (FOV), a high numerical aperture (NA) that inherently results in a shallow Depth of Field (DOF), and a significant loss of signal due to the use of a single narrow slit. The limited FOV is the result of using a microscope objective as the primary light gathering component. The optical elements of a conventional Raman spectrometer are designed to observe only a small area of the sample, which then requires a scanning mechanism to gather sample observations from multiple points of samples. The optics commonly implement a high NA to maximize the collection of light from a small sample point. A conventional Raman spectrometer uses a single list in the optical path and the spectral resolution of the spectrometer is inversely related to the width of the slit; i.e. higher spectral resolution requires a narrower slit that inherently causes a reduction in optical signal strength.

SUMMARY

In certain embodiments, it is desirable to provide a robust, compact Raman spectrometer that utilizes a single-use sample holder to eliminate cross-contamination and replaces the conventional optical elements with arrays of collection lenses, slits, and collimation lenses so as to achieve a larger FOV, greater DOF, and increased light capture and provide a spatially averaged determination of material characteristics across a sample without scanning the sample.

In certain embodiments, it is desirable to provide a spectrometer that is able to capture information about each sample, for example the date and time of testing of the sample, the identity of the user, and the location where the sample was collected, and associate this information with an identifier. In certain embodiments, it is desirable to provide a spectrometer that can upload the identifier and the information and test results to a remote device, for example a cloud-based database. In certain embodiments, it is desirable for the single-use sample holder to be configured to provide a chain-of-custody feature to enable later re-testing and verification of the original test results.

An apparatus for analysis of a sample of a material is disclosed. The apparatus comprises a holder configured to accept the sample. The holder comprises a sample plate having a first surface configured to contact the accepted sample and a sample lens array that is coupled to the sample plate and comprises a plurality of focusing elements.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of a Raman spectrometer that is particularly suited to be carried into the field for use.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form to avoid obscuring the concepts of the subject technology. Like, or substantially similar, components are labeled with identical element numbers for ease of understanding.

Figure 1:
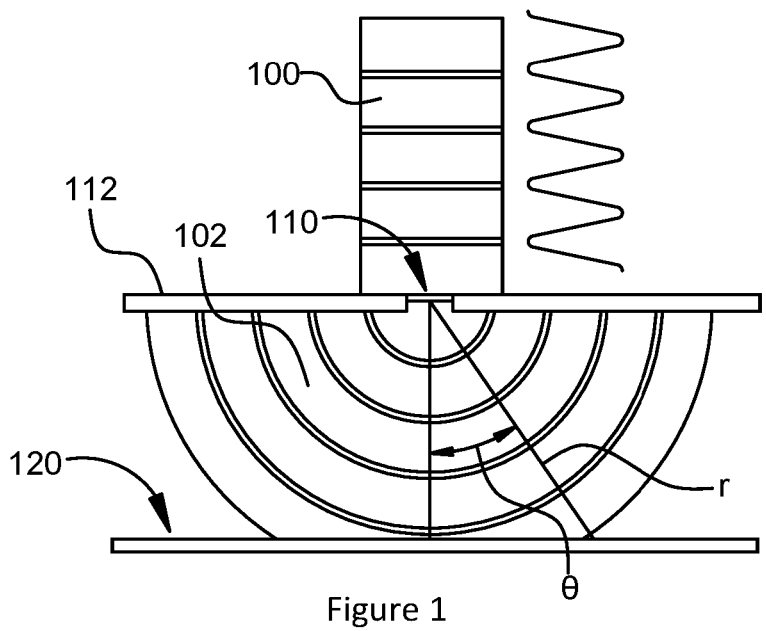
FIG. 1 illustrates diffraction at a slit, according to certain aspects of the present disclosure.

FIG. 1 illustrates diffraction of a coherent monochromatic light beam 100 at a slit 110 in a plate 112, according to certain aspects of the present disclosure. The white lines in the incident beam 100 represent the "valleys" of the sinusoidal wave of the light, shown to the right for reference. The light that passes through the slit 110 is diffracted, also referred to as "scattered," with the diffracted light 102 propagating as a spherical wave toward a surface 120 as seen in FIG. 1.

Figure 2:
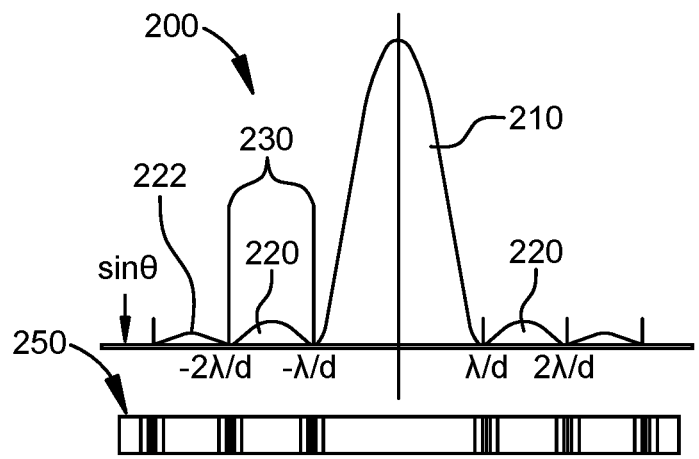
FIG. 2 depicts the intensity distribution of diffracted light, according to certain aspects of the present disclosure.
Figure 3:
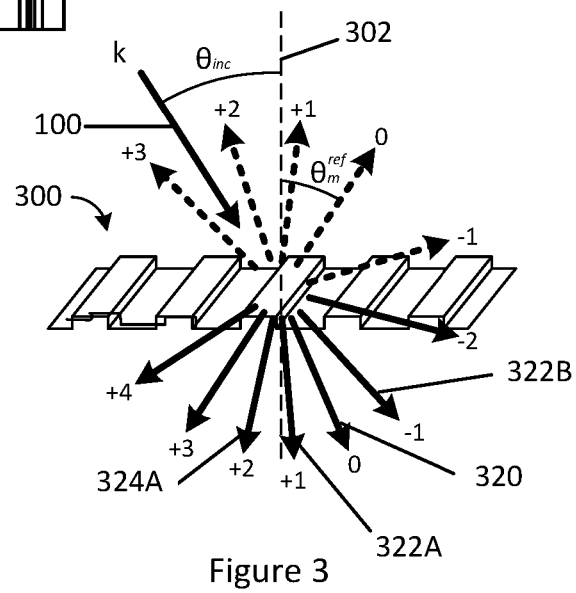
FIG. 3 depicts the refractive and reflective scattering of modes of an incident beam of monochromatic light, according to certain aspects of the present disclosure.

FIG. 2 depicts the intensity distribution 200 of diffracted light 102 on surface 120, according to certain aspects of the present disclosure. The central peak 210 is centered under the incident beam 100 and flanked on both sides by secondary lobes (maxima) 220 and dark lines (minima) 230, with the intensity of each succeeding lobe 222 decreasing as the lateral distance from the center increases. The pattern 250 formed on the surface 120 is governed by equation 1:

$$\sin(\theta_1) = 1.22(\lambda/d) \quad \text{Equation 1:}$$

wherein:
$\theta_1$ is the angular position of the first order diffraction minima (the first dark ring)
$\lambda$ is the wavelength of the incident light
d is the width of the slit FIG. 3 depicts the refractive and reflective scattering of modes of an incident beam of monochromatic light, according to certain aspects of the present disclosure. A beam 100 of coherent light strikes the grating 300 at an angle $\theta_{inc}$ relative to an axis 302 that is perpendicular to the plane of the grating 300. A portion of the incident beam 100 is transmissively diffracted into various modes at various angles $\theta_m^{trn}$ relative to the incident beam 100, wherein "M" is the mode number. For example, beam 320 is the 0th-order mode (primary) transmitted mode, beams 322A, 322B are the $1^{st}$-order transmitted modes, and beams 324A, 324B are the $2^{nd}$-order transmitted modes. The $0^{th}$-order mode is at an angle $\theta_0^{trn}$ while the $1^{st}$-order modes 322A, 322B are at $\pm\theta_1^{trn}$ relative to beam 100.

The angles $\theta_m^{trn}$ are dependent upon the frequency of the incident light, the mode order, the geometry and the index of refraction of the material of the grating 300 as shown in Equation 2. This equation presumes air on both sides of the grating 300.

$$\sin\theta_m = \sin\theta_{inc} - m\frac{\lambda}{\Lambda} \quad \text{Equation 2}$$

wherein:
$\lambda$ is the wavelength of the incident light
$\Lambda$ is the spacing of the lines of the grating
m is the order of the refracted ray
$\theta$ is the angle from perpendicular to the grating, the subscript "inc" indicates the incident ray and the subscript "m" indicates the $m^{th}$ refracted ray A portion of the incident beam 100 may be reflectively diffracted into various modes at various angles $\theta_m^{ref}$ relative to axis 302.

Figure 4:
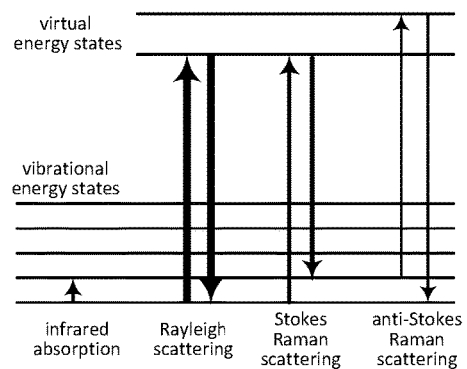
FIG. 4 illustrates Rayleigh scattering, according to certain aspects of the present disclosure.

FIG. 4 illustrates Rayleigh scattering, according to certain aspects of the present disclosure. Raman spectroscopy relies upon inelastic scattering of photons. An incident beam of monochromatic light introduces energy into the molecules of a sample material and excites the system. The material emits the absorbed energy at frequencies associated with the various energy states of its molecules. The shift in energy gives information about the vibrational modes in the system.

Figure 5:
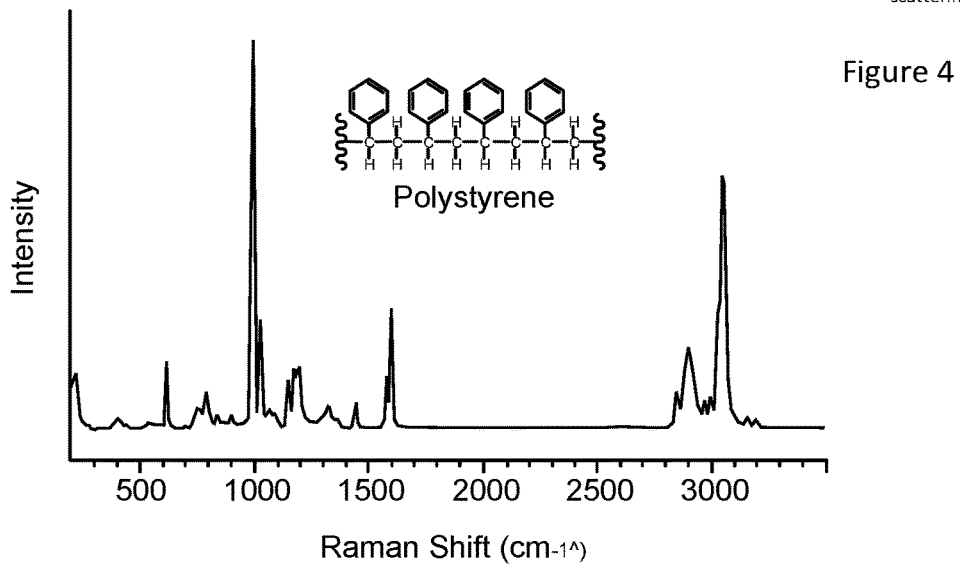
FIG. 5 illustrates an example Raman spectrum, according to certain aspects of the present disclosure.

FIG. 5 illustrates an example Raman spectrum, according to certain aspects of the present disclosure. The light emitted by a material is plotted as intensity vs. frequency shift relative to the frequency of the source light, referred to as the "Raman shift," traditionally measured in a unit called the wavenumber, which is the number of waves per cm ($cm^{-1}$). The spikes of the plot are associated with vibrational modes of chemical bonds in one of the component materials. These spikes are referred to as "Raman bands" and the frequency and relative intensities of the bands allow us to identify the material by comparison of their spectral "signature" with a library of reference signatures of known materials. Heavy atoms and weak bonds have low Raman shifts. Light atoms and strong bonds have high Raman shifts.

The plot of FIG. 5 is the Raman spectrum of polystyrene. The high frequency carbon-hydrogen (C—H) bonds have a resonant frequency that creates the Raman band at about 3000 $cm^{-1}$. The carbon-carbon (C—C) bonds create the small Raman band at around 800 $cm^{-1}$. The C—H vibrations have a higher frequency than the C—C vibrations because hydrogen is lighter than carbon. The vibrations of a complex molecule partly consist of many simple diatomic vibrations while also showing the vibrational modes of larger groups of atoms, such as the expanding/contracting "breathing mode" of the aromatic carbon rings in polystyrene that appears at 1000 $cm^{-1}$.

Figure 6:
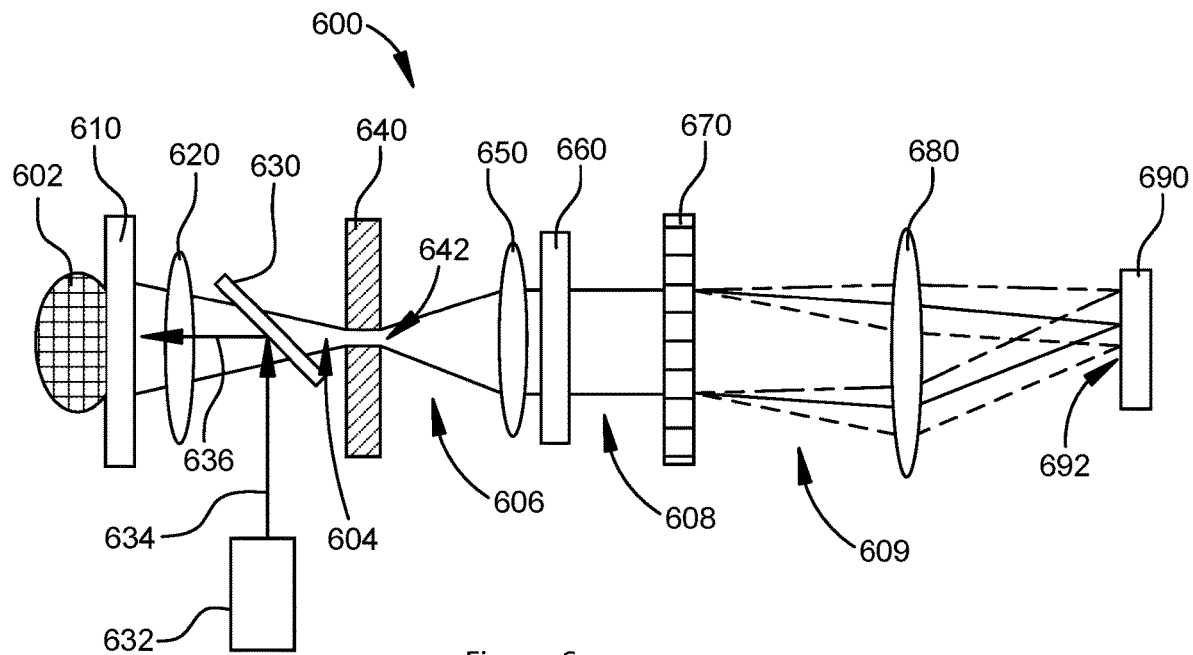
FIG. 6 depicts a schematic representative of a conventional Raman spectrometer, according to certain aspects of the present disclosure.

FIG. 6 depicts a schematic representative of a conventional Raman spectrometer 600, according to certain aspects of the present disclosure. A sample 602 to be characterized is placed against a surface of a sample holder 610. A partially reflective mirror 630 deflects a portion of beam of source light 634 emitted by a light source 632 to travel toward the sample 602 as illumination beam 636. The scattered light emitted by the sample 602 passes through the sample holder 610 and the sample lens 620 to the mirror 630, where a portion 604 of the scattered light continues through a spatial filter, e.g. a slit, 642. The sample lens 310 focuses the light 604 on the spatial filter 642. The light 606 that has passed through the spatial filter 642 is formed into a unidirectional beam 608 by the collimating lens 650. An excitation filter 660 blocks the transmission of the light from source 632. The beam of filtered light 608 strikes the transmissive diffraction grating 670. The diffracted light 609 coming out of the grating 670 is focused by the final focus lens 680 onto surface 692 of a detector 690, which may be a charge-coupled device (CCD) sensor or camera.

Figure 7:
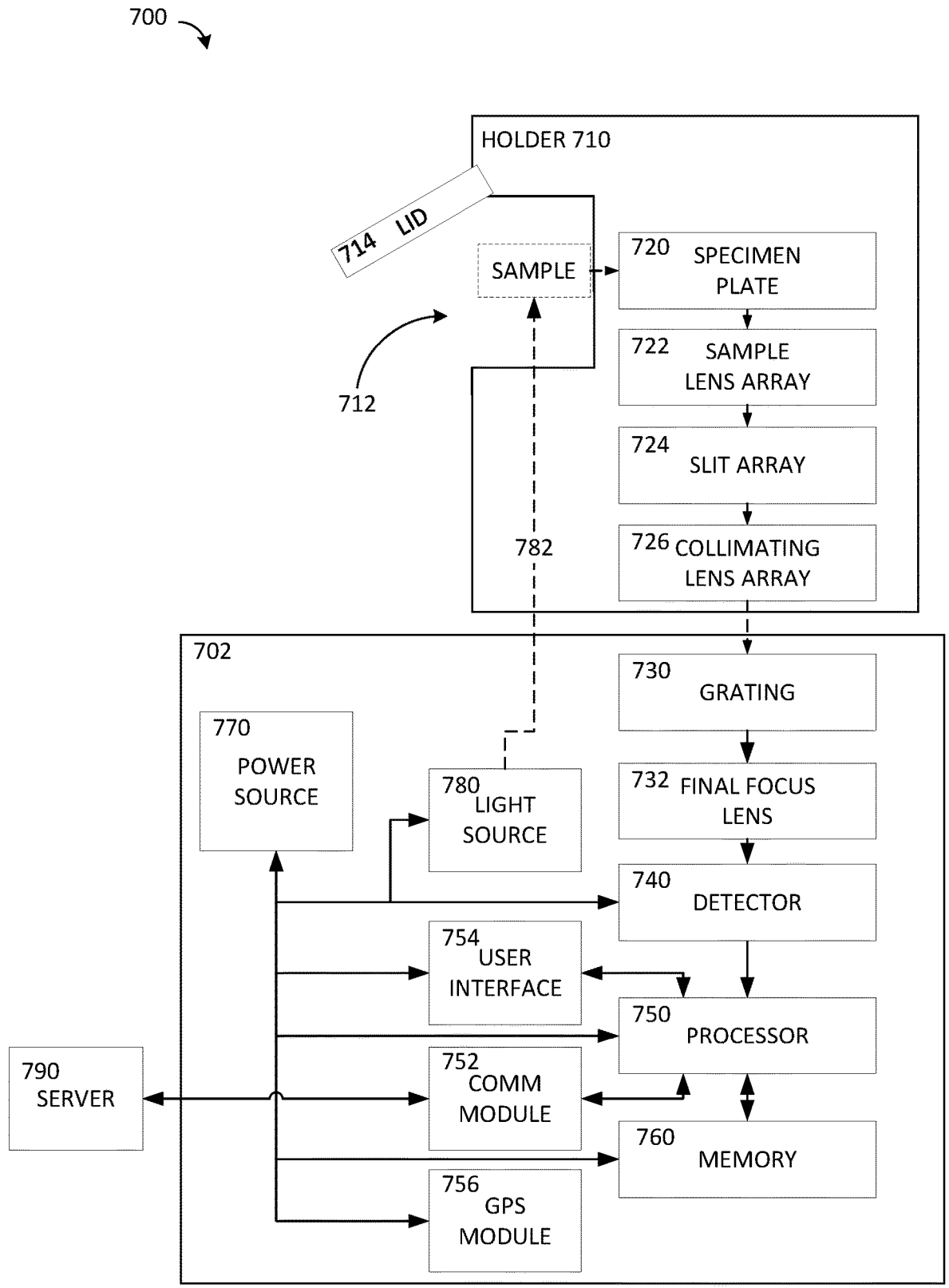
FIG. 7 depicts a block diagram of an exemplary apparatus, according to certain aspects of the present disclosure.

FIG. 7 depicts a block diagram 700 of an exemplary Raman spectrometer, according to certain aspects of the present disclosure. An instrument body 702 is configured to accept a holder 710 that has a compartment 712 configured to accept a sample of a material. In certain embodiments, the holder 710 includes a specimen plate 720, a sample lens array 722, a slit array 724, and a collimating lens array 726. In certain embodiments, the specimen plate forms a portion of the compartment 712.

In certain embodiments, the holder 710 comprises a lid 714 configured to selectably close over the accepted sample and permanently prevent removal of the sample from the holder compartment 712. In certain embodiments, closure of the lid 714 is a non-reversable event wherein the lid 714 cannot be opened again without damage to the lid 714 or holder 710, i.e. evidence of tampering. This feature makes the holder 710 into a tamper-resistant sample container that can be archived for later retrieval and re-examination. In certain embodiments, the lid 714 is hingedly attached to the body of the holder 710.

The instrument body 702 is coupled to a transmissive grating 730, a focusing lens 732, and a detector 740. The detector 740 is communicatively coupled to a processor 750 and configured to provide information about the Raman spectrum of this sample, i.e. the sample signature, to the processor 750. The processor 750 can store the sample signature and associated data, e.g. a date, a sample ID, a location such as where the sample was collected, a field designator, a user name, etc., in the memory 760. The processor 750 is coupled to a comm module 752 that is communicatively coupled to a server 790 that may be at a remote location or implemented as a virtual device on a "cloud" server. In certain embodiments, the server 790 is implemented as a software service. The body 702 is also coupled to a user interface 754, for example a color graphics display with an overlaid touchscreen. The body 702 is also coupled to a power supply 770 that provides power to all of the electronic components of the apparatus and, in certain embodiments, received information from one or more of the components. In certain embodiments, the body 702 is also coupled to a GPS module 756 that provides location information to the processor 750.

Light 782 from the light source 780 is guided to the sample, which is shown as contained in compartment 712 having a lid 714 in this example. The sample is stimulated by the light 782 to emit light, a portion of which passes through the sample plate 720, the sample lens array 722, the slit array 724, and the collimating lens array 726 to the grating 730. The light is refracted by the grating 726 and a portion of the refracted light passes through the final focus lens 732 to the detector 740.

Detector 740 creates data that is provided to the processor 750. The processor 850 is communicatively coupled a memory 760 via a bidirectional path. In certain embodiments, the memory 760 contains instructions that, when transferred to the processor 750 and executed by the processor 750, cause the processor 750 to receive the data from the detector 740, compare the received data with a portion of one or more reference files, and determine an attribute of the sample.

In certain embodiments, memory 760 also contains the one or more reference files that are respectively associated with one or more materials and the instructions comprise instructions to transfer a portion of the files to the processor 750. In certain embodiments, the one or more reference files are stored on the server 790 that is communicatively connected to the processor 750 through the comm module 752, for example over a wired and/or wireless network.

In certain embodiments, the light source 780 emitting light at a determined frequency. In certain embodiments, the frequency is in the infrared band. In certain embodiments, the frequency is in the visible band. In certain embodiments, the frequency is in the ultraviolet band. In certain embodiments, the light source 780 comprises an optical filter (not shown in FIG. 7) that passes light only in a selected band having a frequency bandwidth. In certain embodiments, the source 780 emits light in a band having a bandwidth that is less than or equal to 5 nm. In certain embodiments, the source 780 emits light in a band having a bandwidth that is less than or equal to 2 nm. In certain embodiments, the light source 780 comprises a plurality of sources each emitting light at a different frequency.

Figure 8:
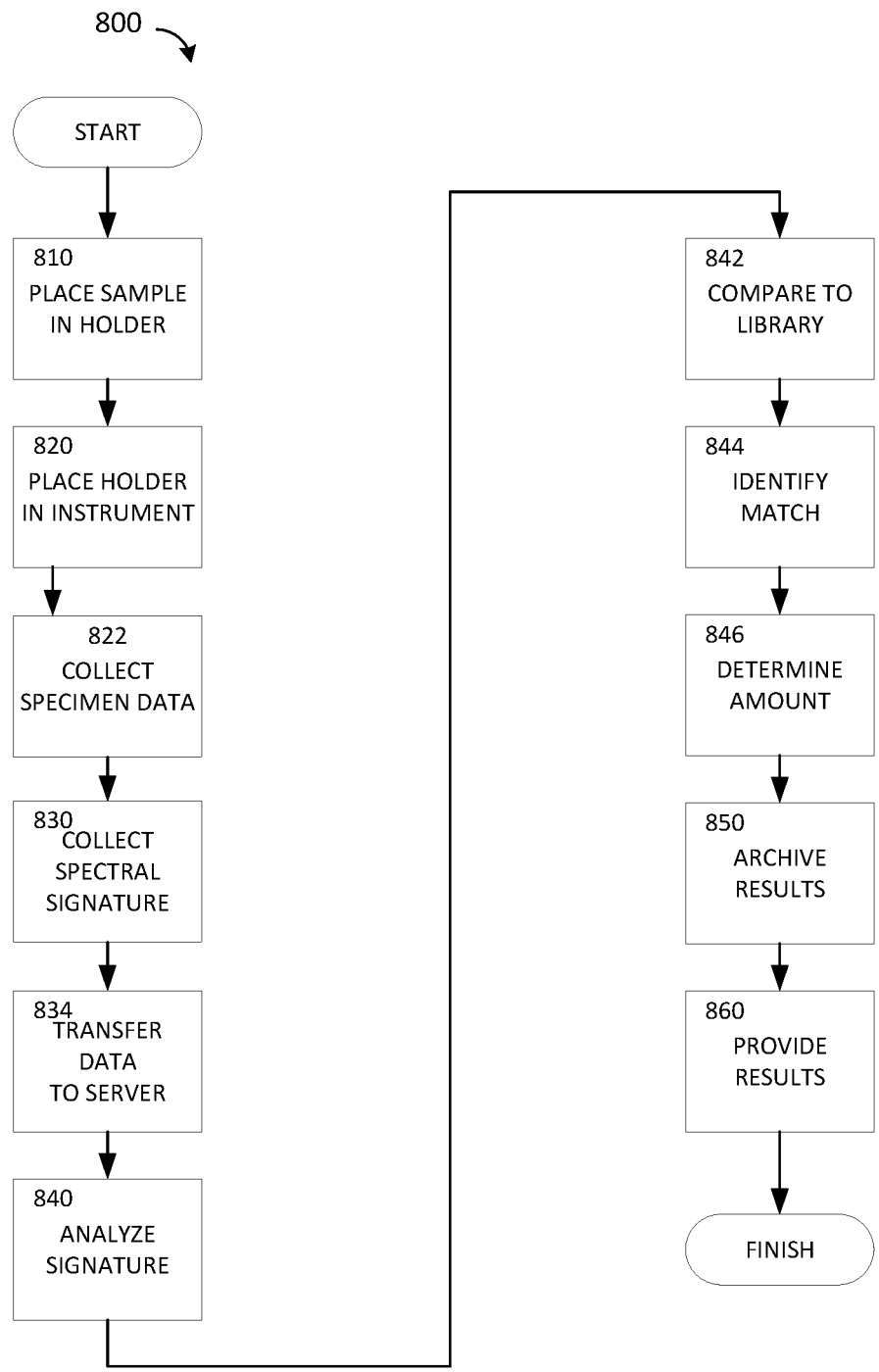
FIG. 8 depicts a flow chart of an exemplary method of use, according to certain aspects of the present disclosure.

FIG. 8 depicts a flow chart 800 of an exemplary method of use, according to certain aspects of the present disclosure. In the first step 810, a user places a sample of a material in the holder. This step may include closing a lid over the sample and, in certain embodiments, closing of the lid may be a one-time action, i.e. a non-reversable event. In step 820, the user places the holder in the instrument body. In step 822, the user performs set-up and data entry operations. In certain embodiments, one of steps 820 and 822 includes the instrument retrieving a unique identifier (ID) from the holder that was placed in the body and storing this ID. In certain embodiments, one of steps 820 and 822 includes determination of the current physical location of the instrument using a locating system, e.g. an internal global position system (GPB) module and storage of the location.

Once the instrument is fully configured for this sample, the user initiates the analysis of the sample in step 830. In certain embodiments, step 830 comprises one of more of collection of multiple spectral signatures using different frequencies of source light and collection of multiple spectral signatures using different optical filters to modify the light emitted by the sample. In certain embodiments, step 830 comprises stimulation of the sample, for example by exposure of the sample to one or more of a magnetic field, an electrostatic field, and a radio frequency (RF) field. In certain embodiments, step 830 comprises introduction of a fluid into the sample.

After the spectral signatures are collected, the instrument transfers a portion of the data, which includes one or more of the spectral signatures and information entered by the user and determined by the instrument, to a server that may be remote.

Software on the server analyzes the data in step 840, compares the results of the analysis to a library of signatures in step 842, and identifies a match between the sample and the materials of the library in step 844.

In step 846, the software on the server analyzes the spectral signatures and determines an amount of the matched material in the sample. In certain embodiments, the analysis determines an amount present only for a pre-determined material. In certain embodiments, the analysis may calculate a ratio of the amount of one material to the amount of another material.

Step 850 stores the results of the analysis and the data in a memory on the server. In certain embodiments, the memory is located separate from the server. In certain embodiments, the results are sent to the instrument and stored in a memory in the instrument or a removable drive, e.g. a thumb drive, attached to the instrument. The results are sent to the instrument in step 860 and provided to the user on the user interface. In certain embodiments, step 860 includes providing the information on one of a personal computer, a laptop, a tablet, a smart phone, or other display.

Figure 9A:
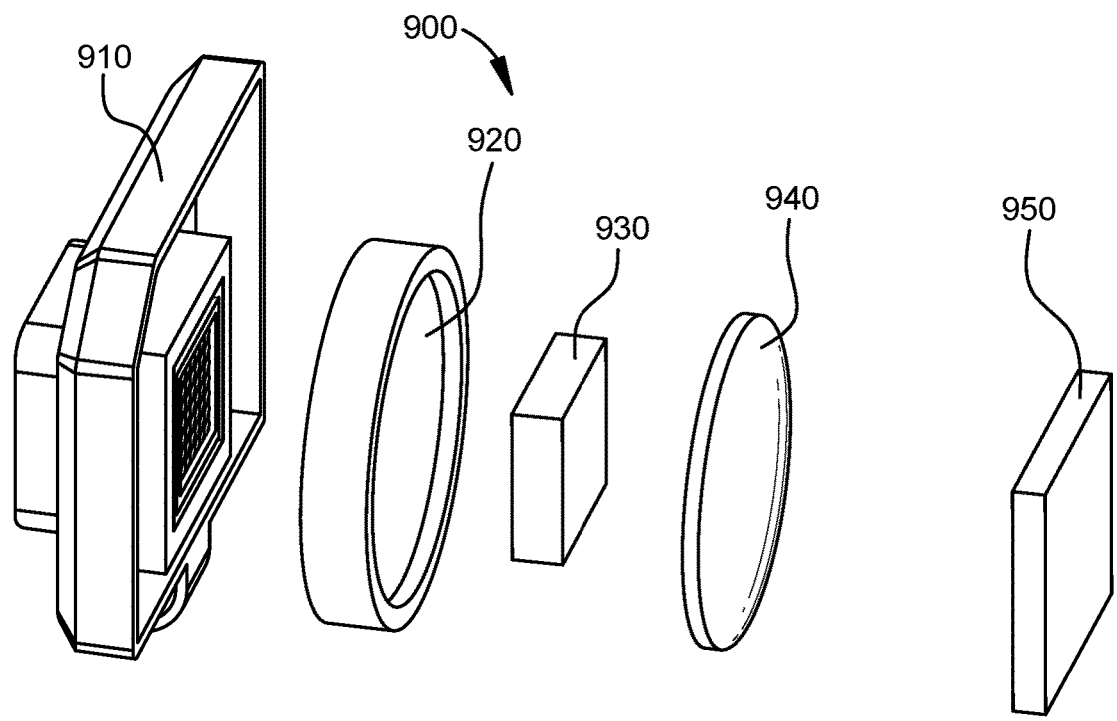
FIGS. 9A-9B depicts exemplary embodiments of an optical system of the apparatus, according to certain aspects of the present disclosure.

FIG. 9A depicts an exemplary embodiment of an optical system 900 of the apparatus, according to certain aspects of the present disclosure. In this embodiment, the system 900 comprises a holder 910, an optical filter 920, a grating 930, a focusing lens 940, and a detector 950. The optical filter 920 is configured to block the wavelength of the excitation light. The grating 930 separates the light emitted by the sample into its various wavelengths. The focusing lens 940 focuses each separated wavelength onto the detector 950 in a spatially separated position.

Figure 9B:
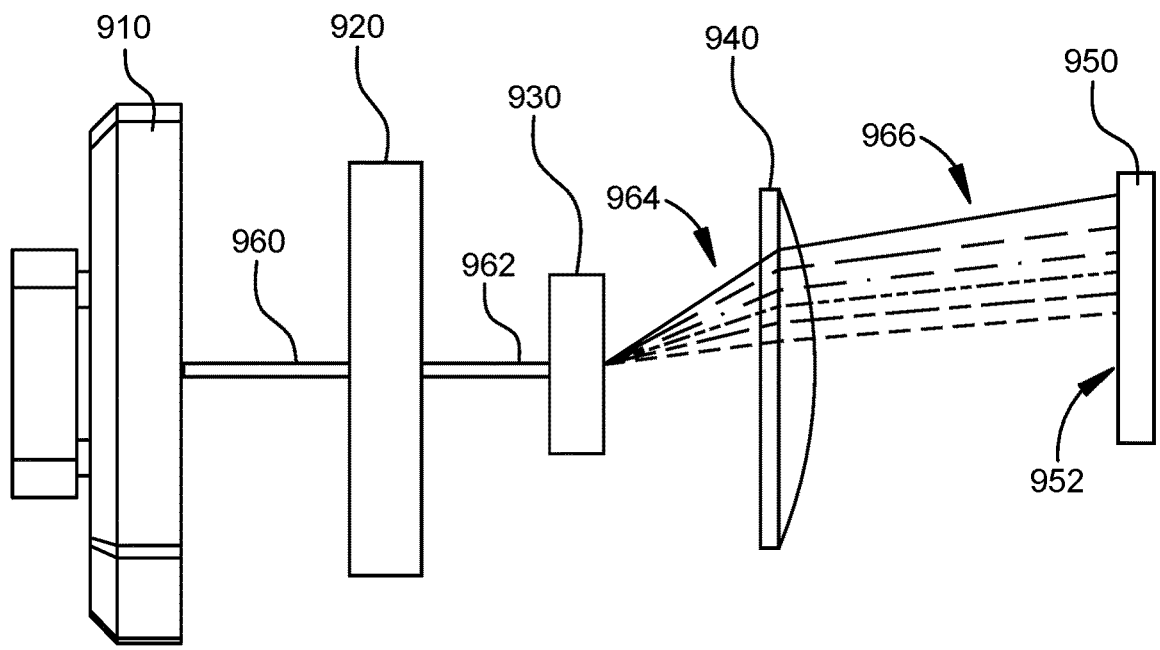

FIG. 9B depicts the passage of light emitted by the sample (not visible as it is located within the holder 910) through the optical system 900, according to certain aspects of the present disclosure. A single beam 960 of collimated light being emitted from the holder 910 is shown for clarity, although there are a plurality of adjacent beams of light coming from the holder 910 that are collimated and parallel to each other. After passing through the filter 920, the filtered light 962 strikes the grating 930 and a portion is transmissively refracted into a refracted beam 964. Each of the matching-wavelength spectral sub-component beams 964 of the plurality of adjacent beams of light that are exiting the grating 930 are still collimated and parallel to each other, i.e. all sub-components at the same wavelength will enter the focusing lens 940 at the same angle. For example, the green portions from the multiple beams are all collimated and parallel to each other as they enter the focusing lens 940. The focusing lens 940 focuses the spectral sub-component beams 964 into converging sub-component beams 966 that have foci on a plurality of spatially separate locations on the detector 950.

In certain embodiments, the focusing lens 940 comprises multiple elements for focusing and beam shaping. In certain embodiments, the focusing lens 940 comprises one or more of a curved mirror and a flat mirror. In certain embodiments, the detector 950 comprises one or more of a linear 1D array of sensing elements, e.g. pixels, and a 2D array of sensing elements.

Figure 10A:
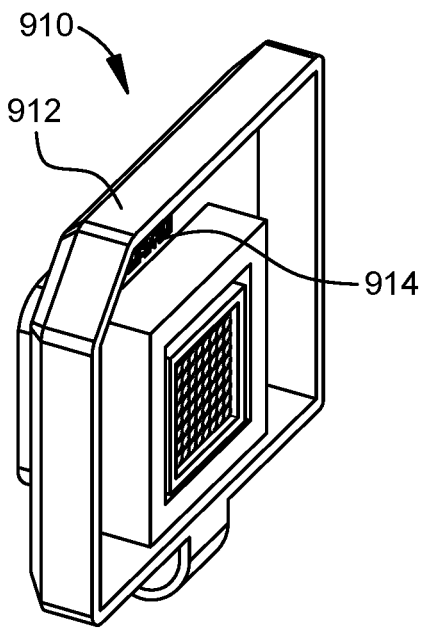
FIGS. 10A-10C depicts an exemplary embodiment of a disposable holder, according to certain aspects of the present disclosure.

FIG. 10A depicts an exemplary embodiment of a single-use holder 910, according to certain aspects of the present disclosure. The holder 910 has a frame 912 on which is printed a unique identifier 914, e.g. a matrix code. In certain embodiments, the identifier 914 comprises a human-readable code. In certain embodiments, the identifier 914 comprises an electronic device, e.g. a ROM chip or an RFID chip, that stores the identifier.

Figure 10B:
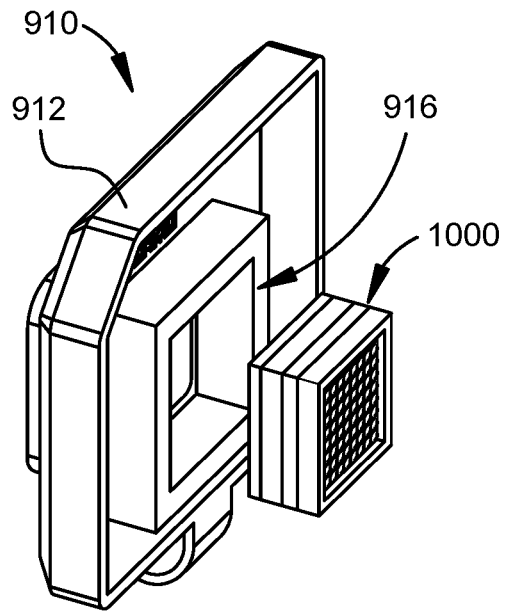

FIG. 10B depicts an optical assembly 1000 removed from the cavity 916 of the holder. The cavity 916 is adjacent to a compartment (not visible in FIG. 10B) of the frame 912 that is configured to accept a sample of a material such that the sample is pressed against the optical assembly 1000.

Figure 10C:
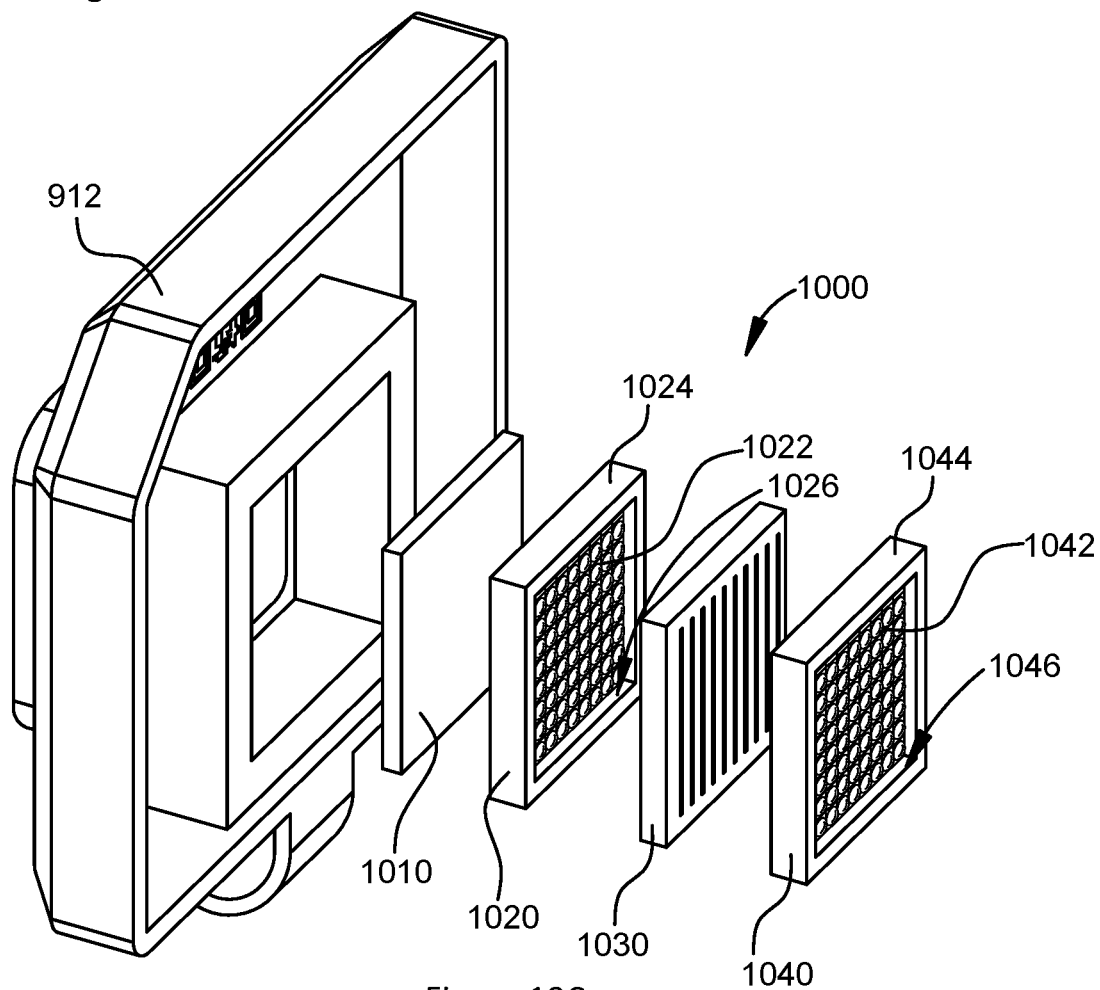

FIG. 10C depicts an exploded view of an exemplary optical assembly 1000, according to certain aspects of the present disclosure. In this embodiment, optical assembly 1000 comprises a sample plate 1010, a sample lens array 1020, a slit array 1030, and a collimating lens array 1040, each coupled to at least one of the adjacent component and to the frame 912. In this embodiment, the sample plate 1010 is an optically clear planar sheet that is disposed, when the optical assembly 1000 is mounted in the frame 912, proximate to the sample compartment such that the sample is in contact with a surface of the sample plate 1010. Other embodiments of the sample plate are discussed with respect to FIGS. 12A and 12B.

The sample lens array 1020 comprises a plurality of focusing elements 1022 that are mounted in a frame 1024 with a set-back 1026 that provides clearance for the height of the focusing elements 1022 as well as a portion of a separation of the focusing elements 1022 from the next component. In certain embodiments, the focusing elements 1022 comprise one or more of spherical, aspherical, and diffractive optical components. In certain embodiments, the plurality of focusing elements 1022 are configured to collect light from a respective plurality of regions of the surface of the sample and produce a respective plurality of beams of light.

The slit array 1030 comprises one or more slits each having a width. In certain embodiments, a portion of the plurality of focusing elements 1022 is arranged in a straight row that is parallel to a slit of the slit array 1030 and the focusing elements of the row are configured to focus the respective beams of light on the slit. In certain embodiments, the plurality of focusing elements and the plurality of slits are arranged in a non-rectilinear pattern, e.g. concentric circles.

The collimating lens array 1040 comprises a plurality of collimating lenses 1042 mounted in a frame 1044 with a set-back 1046 that provides clearance for the height of the collimating lenses 1042 as well as a portion of a separation of the collimating lenses 1042 from the next component. In certain embodiments, a portion of the plurality of collimating lenses 1042 is arranged in a straight row that is parallel to a slit of the slit array 1030. Each collimating lens 1042 is configured to accept the refracted light emanating from one of the slits and modify the light to form a collimated beam of light. All of the modified plurality of beams of light are collimated in a common direction.

In certain embodiments, the diameter of the individual focusing elements 1022 and/or the collimating lenses 1042 is less than 125 nm. In certain embodiments, the focusing elements 1022 and/or the collimating lenses 1042 are holographic lenses. In certain embodiments, the use of holographic lenses in place of conventional lenses provides a 10× improvement in light capture. In certain embodiments, the use of holographic lenses in place of conventional lenses provides a 50× improvement in light capture. In certain embodiments, the use of holographic lenses in place of conventional lenses provides a 100× improvement in light capture.

In certain embodiments, the separation of the sample plate 1010 from the sample lens array 1020 is less than 5 mm. In certain embodiments, the separation of the sample plate 1010 from the sample lens array 1020 is less than 2 mm. In certain embodiments, the separation of the sample lens array 1020 and the slit array 1030 is less than 5 mm. In certain embodiments, the separation of the sample lens array 1020 and the slit array 1030 is less than 2 mm. In certain embodiments, the separation of the slit array 1030 and the collimating lens array is less than 5 mm. In certain embodiments, the separation of the slit array 1030 and the collimating lens array is less than 2 mm.

Figures 11A, 11B:
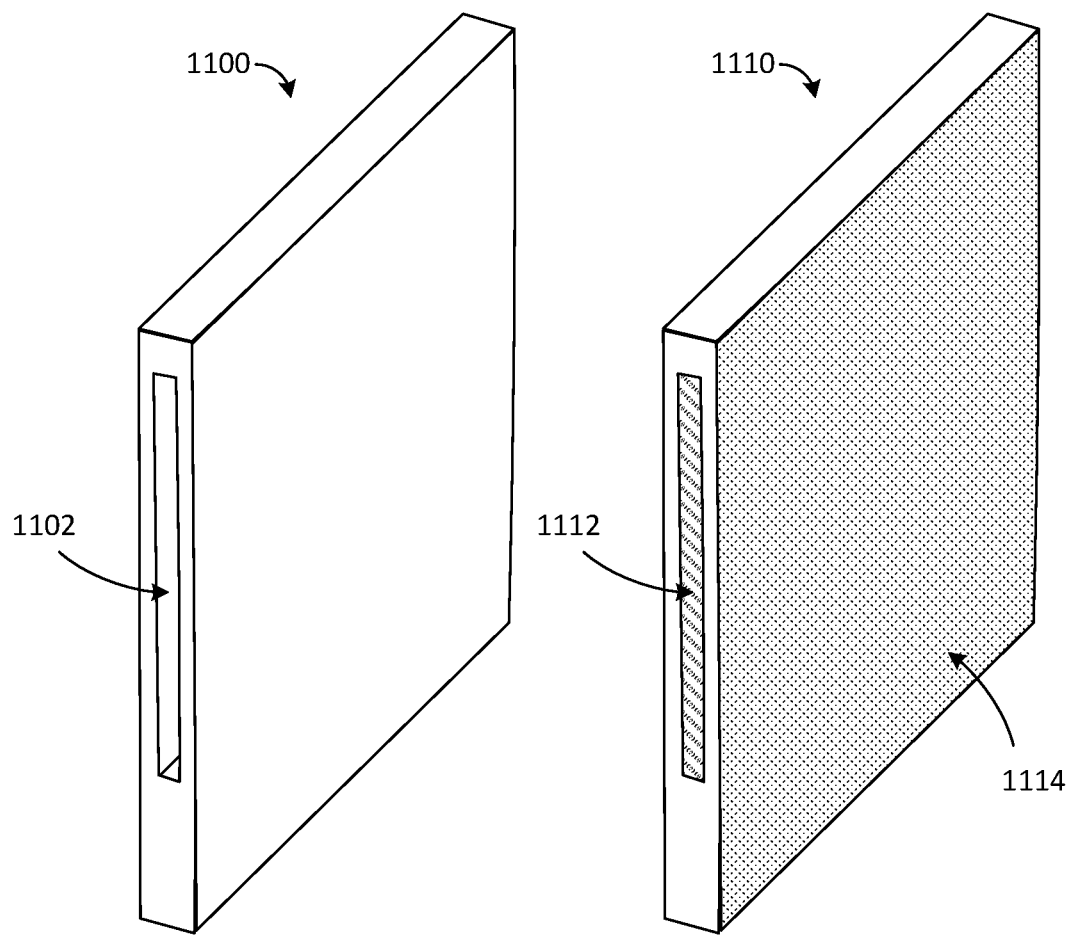
FIGS. 11A-11C depicts exemplary embodiments of a sample plate, according to certain aspects of the present disclosure.

FIG. 11A depicts an exemplary embodiment of a sample plate 1100, according to certain aspects of the present disclosure. The sample plate 1100 comprises a channel 1102 that is configured to accept a liquid sample (not shown in FIG. 11A). In certain embodiments, the channel 1102 passes through the width of the sample plate 1100 so as to form a passage through which a liquid sample can flow, thus enabling continuous monitoring of a stream to be periodically tested. In certain embodiments, the channel 1102 is a sealed compartment with entrance and exit ports (not shown in FIG. 11A) so as to facilitate introduction of a liquid sample into the channel 1102 and removal of air.

FIG. 11B depicts an exemplary embodiment of a sample plate 1110, according to certain aspects of the present disclosure. In certain embodiments, the sample plate 1110 comprises an actuator 1112 at least partially embedded in the sample plate 1110. In certain embodiments, the actuator 1112 is selected from the group of a temperature-control element, a filtering element, and a stimulation element. In certain embodiments, the temperature-control element can perform at least one of heating or cooling the sample. In certain embodiments, the filtering element can selectively allow or block selected frequencies of light. In certain embodiments, the stimulation element generates one of a magnetic field, an electrostatic field, and a dynamically oscillating electric field, e.g. a radiofrequency (RF) field. In certain embodiments, the sample plate 1110 comprises a coating 1114 on one or more surfaces. In certain embodiments, the coating 1114 functions as one or more of an optical filter, an electric shield, an antenna, and an electric conductor that may be patterned.

Figure 11C:
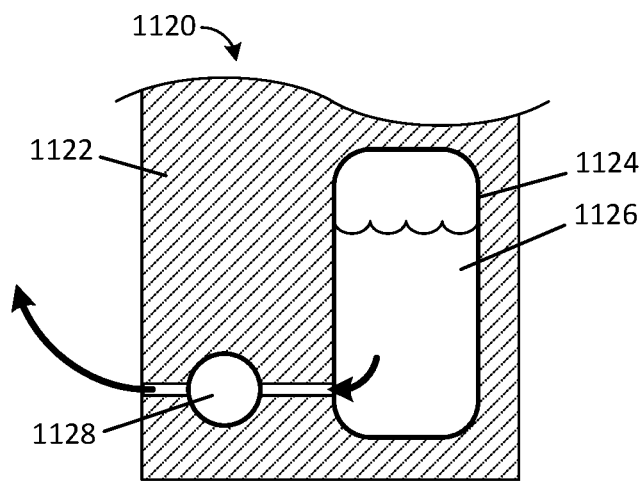

FIG. 11C depicts an exemplary embodiment of a sample plate 1120, according to certain aspects of the present disclosure. In certain embodiments, the sample plate 1120 comprises a reservoir 1124 embedded within the body 1122 of the sample plate 1120 and configured to contain a fluid 1126 and a pump 1128 fluidically coupled between the reservoir 1124 and a surface of the sample plate 1120 and configured to selectably expel a portion of the fluid 1126 from the sample plate.

Figure 12A:
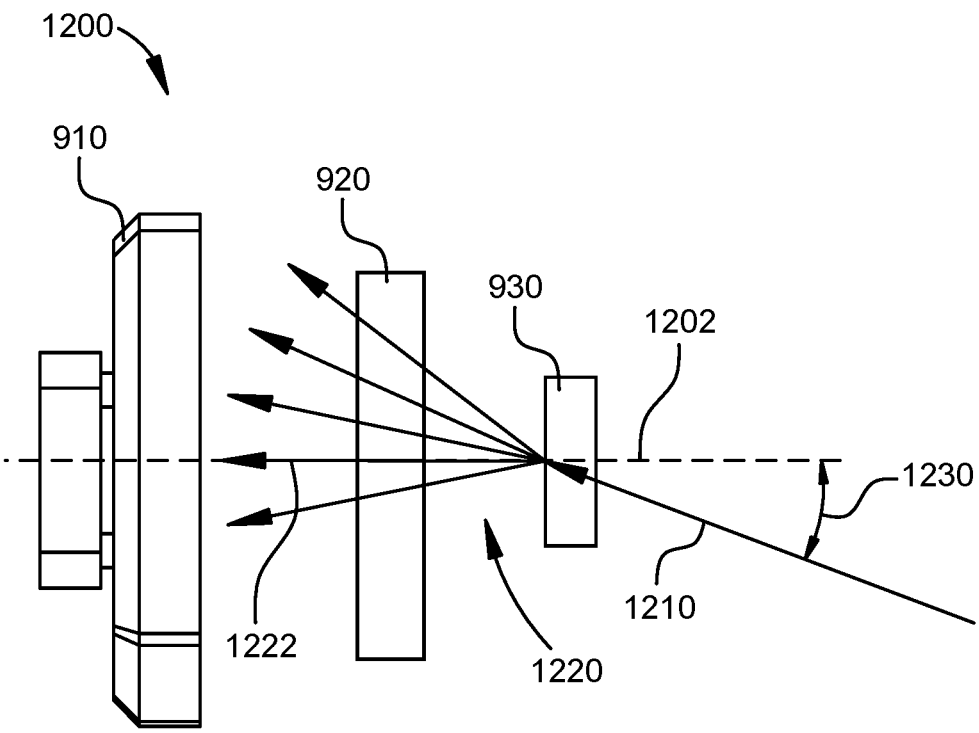
FIG. 12A-12B depicts exemplary means of providing illumination of the sample, according to certain aspects of the present disclosure.
Figure 12B:
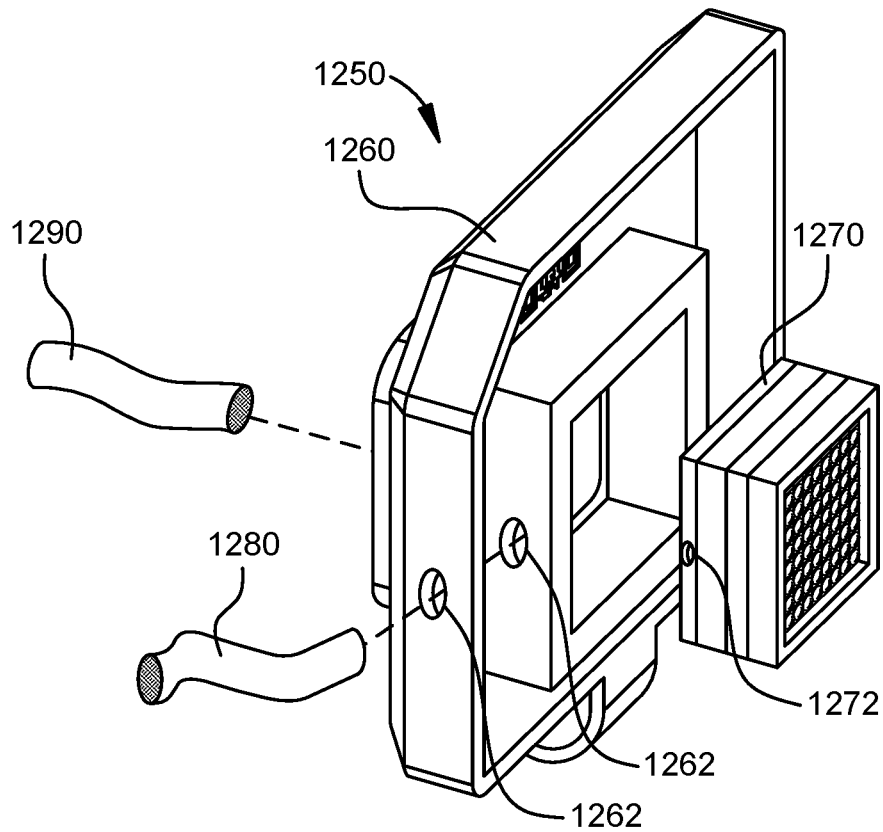

FIG. 12A-12B depicts exemplary means of providing illumination to the sample, according to certain aspects of the present disclosure.

FIG. 12A depicts a schematic of certain aspects of a novel Raman spectrometer 1200, according to certain aspects of the present disclosure. In this exemplary embodiment, an incident ray 1210 of coherent, monochromatic, unidirectional illuminating light strikes a transmissive diffraction grating 930 at an angle 1230. In certain embodiments, angle 1230 is selected such that one of the mode rays 1220 is directed along the optical axis 1202 of the spectrometer 1200. In certain embodiments, the angle 1230 is selected to direct a higher-order mode ray, for example a $1^{st}$-order ray 1222, along the optical axis 1202. In certain embodiments, the angle 1230 is selected to direct the primary ray along the optical axis 1202.

One advantage of the novel arrangement of the light source (not shown in FIG. 12A) is the elimination of the partially reflective mirror 630 shown in FIG. 6. As the light in a conventional spectrometer must be first reflected and then transmitted by the mirror 630, there is a loss of energy, normally about 50%, of the scattered light coming from the sample. Although the selected mode with have only a portion of the energy of the incident beam 1210, there is no energy loss in the optical path from the sample to the grating 930.

A second advantage of the spectrometer 1200 is the more compact arrangement of components, as the light source is now generally aligned with the long dimension of the device, while a conventional spectrometer 600 has a laser light source 632, which may be large and heavy, positioned on one side. Repositioning the source 632 in a conventional design requires additional optical elements, for example folding mirrors and rigid supporting structure, that add weight and cost.

Light passing through grating 920 from a first surface to a second surface on the opposite side of the grating 920 from the first surface is described as passing through the grating 920 in a first direction, regardless of the angle of the path of the light to a perpendicular reference axis, such as axis 1202. Similarly, light passing through grating 920 from the second surface to the first surface is described as passing through the grating 830 in a second direction regardless of whether the path of the light traveling in the second direction is parallel to the path of the light traveling in the first direction. The use of "first direction" and "second direction" are meant only to convey the general direction of transmission from one surface to another.

FIG. 12B depicts another exemplary embodiment of means of providing illumination of the sample, according the certain aspects of the present disclosure. In certain embodiments, a beam of illuminating light is provided via a fiber optic cable 1280, or functional equivalent, that passes through openings 1262 in the frame 1260 of holder 1250 and then into a receiving port 1272 of the sample plate 1270. This type of side illumination is known in optics and provides light output across the planar surface of the sample plate 1272.

In certain embodiments, the beam of illuminating light is provided via a fiber optic cable 1290, or functional equivalent, that passes through the holder 1250 from a backside and mates with a diffuser (not visible in FIG. 12B) within the frame 1260 and disperses the light across the planar surface of the sample plate 1270.

In certain embodiments, the illumination light is modulated, for example by driving the light source with a square wave, thereby producing periods of illumination of the sample, i.e. when the source is on, separated by intervals of dark, i.e. when the source is off. Sensing of the output of the detector is synchronized with the square wave, for example by recording the output only while the source is off and adding the recordings of multiple dark intervals. In certain embodiments, sensing of the output of the detector occurs during portions of both the illuminated periods and the dark periods and the respective sets of measurements are compared during analysis.

SUMMARY

Certain embodiments of the disclosed Raman spectrometer incorporate a novel arrangement of a light source that introduces the light into the optical path of the apparatus by passing the light through the transmissive diffraction grating in direction opposite the direction of the light passing from the sample to the detector. This novel arrangement beneficially reduces the size and complexity of the optical path by eliminating components that are critical in conventional spectrometers.

Certain embodiments of the disclosed Raman spectrometer consolidate critical elements of the optical path into a single-use holder. Miniaturization of the optical elements and the use of arrays of lenses in place of single lenses enables precise alignment without requiring complex alignment techniques during manufacturing.

EMBODIMENTS

A1. An apparatus for analysis of a sample, comprising: a frame having a first axis; a sample holder coupled to the frame and disposed on the first axis; a transmissive diffraction grating coupled to the frame and disposed along the first axis such that light traveling along the first axis from the sample holder passes through the grating in a first direction; and a source coupled to the frame and configured to emit a first light to pass through the grating in a second direction that is opposite the first direction.

A2. The apparatus of A1, further comprising: a lens coupled to the frame; and a spatial filter coupled to the frame; wherein the lens and spatial filter are disposed along the first optical axis.

A3. The apparatus of A1, wherein a portion of the first light emitted by the source is diffracted by the grating to travel parallel to the first optical axis.

A4. The apparatus of A3, wherein: the light emitted by the source is monochromatic; the diffracted portion of the first light comprises a mode; the light emitted by the source travels to the grating along a second optical axis that is not parallel to the first optical axis; and an angle between the first and second optical axes determines the mode of the diffracted portion of the first light.

A5. The apparatus of A4, wherein: the light source comprises a plurality of sources each emitting light at a plurality of unique frequencies; the second optical axis comprises a plurality of secondary optical axes that are respectively associated with the plurality of unique frequencies and respectively disposed at a plurality of unique angles to the first optical axis.

A6. The apparatus of A3, wherein: the light emitted by the source is white light; the diffracted portion of the white light comprises a color; the light emitted by the source travels to the grating along a second optical axis that is not parallel to the first optical axis; and an angle between the first and second optical axes determines the color of the diffracted portion of the light.

A7. The apparatus of A1, wherein: the sample holder is configured to accept the sample such that the sample is disposed on the first optical axis; the first light illuminates the sample, whereupon the sample emits a second light that enters the grating in the first direction; and a portion of the second light exits the grating as diffracted second light; the apparatus further comprises: a lens coupled to the frame and configured to focus the diffracted second light to form a Raman spectrum; a detector coupled to the frame and configured to sense the Raman spectrum and provide data related to the Raman spectrum; a processor communicatively coupled to the detector; and a non-volatile memory communicatively coupled to the processor and comprising: a reference file associated with a material; and an instruction file that, when executed by the processor, causes the processor to receive the data from the detector, compare the received data with a portion of the reference file, and determine an attribute of the sample.

A8. The apparatus of A7, wherein the attribute of the sample comprises an amount of a material component in the sample.

A9. The apparatus of A1, wherein the light passes from the source to the grating without being reflected.

B1. A method of obtaining a Raman spectrum of a sample, the method comprising the steps of: illuminating the sample with a first light, whereupon the sample emits a second light that passes through a transmissive diffraction grating in a first direction and exits the grating as diffracted second light, wherein the first light passed through the grating in a second direction opposite the first direction prior to illuminating the sample; focusing the diffracted second light to form a Raman spectrum.

B2. The method of B1, further comprising the steps of: coupling a disposable element to an apparatus, wherein the disposable element comprises a sample holder and the grating and the apparatus comprises a light source configured to emit the first light; and placing the sample on the sample holder.

B3. The method of B1, wherein the first light is coherent.

B4. The method of B1, wherein the first light is monochromatic.

B5. The method of B1, further comprising the step of filtering the second light to remove a portion of the first light.

B6. The method of B1, further comprising the step of evaluating the Raman spectra to determine an attribute of the sample.

B7. The method of B6, wherein the attribute of the sample comprises an amount of a material component in the sample.

C1. An apparatus for analysis of a sample of a material, comprising a holder configured to accept the sample, the holder comprising a sample plate comprising a first surface configured to contact the accepted sample; and a sample lens array coupled to the sample plate, the sample lens array comprising a plurality of focusing elements.

C2. The apparatus of C1, wherein the holder further comprises a slit array coupled to the sample lens array, the slit array comprising a plurality of slits; and a collimating lens array coupled to the slit array, the collimating lens array comprising a plurality of collimating lenses.

C3. The apparatus of C1, wherein the plurality of focusing elements are configured to collect light from a respective plurality of regions of the surface of the sample and produce a respective plurality of beams of light.

C4. The apparatus of C2, wherein a portion of the plurality of focusing elements are arranged in a first straight row that is parallel to a first slit of the plurality of slits of the slit array; and the focusing elements of the first row are configured to focus their respective beams of light on the first slit.

C5. The apparatus of C4, wherein the plurality of collimating lenses are configured to receive a portion of the plurality of beams of light that pass through the plurality of slits; and modify each of the plurality of beams of light such that all of the modified plurality of beams of light are collimated in a common direction.

C6. The apparatus of C1, wherein the holder further comprises a compartment configured to accept the sample, wherein the sample plate forms a portion of the compartment; and a lid that is coupled to the holder and configured to selectably close over the compartment and permanently prevent removal of an accepted sample from the holder.

C7. The apparatus of C1, wherein the focusing elements are holographic lenses.

C8. The apparatus of C2, wherein the collimating lenses are holographic lenses.

C9. The apparatus of C1, wherein the sample plate further comprises a channel configured to accept a liquid sample.

C10. The apparatus of C1, wherein the sample plate further comprises an actuator selected from the group of a temperature control element, a filtering element, and a stimulation element.

C11. The apparatus of C1, wherein the holder is configured to accept a beam of illuminating light and guide the accepted beam of illuminating light to a side of the sample plate that is not the first surface.

C12. The apparatus of C1, further comprising a frame configured to removably accept the holder; a detector coupled to the frame; a focusing lens coupled to the frame; and a transmissive diffraction grating coupled to the frame.

C13. The apparatus of C12, further comprising an optical filter coupled to the frame; and a spatial filter coupled to the frame.

C14. The apparatus of C12, wherein the grating comprises a first surface and a second surface that is opposite the first surface; a portion of a beam of light emitted by the accepted sample passes through the grating from the first surface to the second surface; and the frame is further configured to accept a beam of illuminating light and guide the accepted beam of illuminating light to the second surface of the grating such that a refracted portion of the beam of illuminating light is directed through the grating and exits the first surface toward the accepted sample.

C15. The apparatus of C1, wherein the holder is configured for use with only a single sample.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. An apparatus for analysis of a sample of a material, comprising:
   a body configured to accept the sample;
   a detector coupled to the body and comprising a sensitive surface comprising a plurality of points, the detector configured to provide a signal comprising information about a respective plurality of intensities of light received at the plurality of points;
   a slit array coupled to the body and comprising a plurality of slits configured to collected light from a respective plurality of portions of the accepted sample;
   a collimating lens array coupled to the body and comprising a plurality of lenses configured to receive the collected light from respective slits of the slit array and collimate the collected light from all slits in a common direction;
   a diffraction grating coupled to the body and configured to diffract the collimated light received from the collimating lens array; and
   a focusing lens coupled to the body and configured to receive the diffracted light from the diffraction grating and focus light of a common frequency on a common point of the plurality of the points of the detector.

2. The apparatus of claim 1, wherein the light from the accepted sample reaches the slit array without passing through or being reflected by a partially reflective mirror.

3. The apparatus of claim 1, further comprising a light source coupled to the body and configured to illuminate the accepted sample when the holder is accepted into the body.

4. The apparatus of claim 3, wherein the light from the light source has a bandwidth that is less than or equal to 5 nm.

5. The apparatus of claim 3, wherein the light from the light source reaches the accepted sample without passing through or being reflected by a partially reflective mirror.

6. The apparatus of claim 1, wherein the plurality of slits collectively captures more light from the accepted sample than a single slit would capture from the same sample, thereby increasing the intensity of the light received at the detector.

7. The apparatus of claim 1, wherein:
   the body comprises a holder configured to accept the sample; and
   the body is configured to removably accept the holder.

8. The apparatus of claim 7, wherein the holder comprises one or more of the slit array and the collimating lens array.

9. A sample holder, comprising:
   a frame comprising:
      a cavity configured to accept a sample of a material; and
      a planar sample plate forming a portion of the compartment and comprising a first surface configured to contact the accepted sample; and
   an actuator selected from the group of a temperature-control element, a filtering element, and a stimulation element.

10. The sample holder of claim 9, wherein the temperature-control element can perform at least one of heating or cooling the sample.

11. The sample holder of claim 9, wherein the filtering element can selectively allow or block selected frequencies of light.

12. The sample holder of claim 9, wherein the stimulation element generates one of a group consisting of a magnetic field, an electrostatic field, and a dynamically oscillating electric field.

13. A sample holder, comprising:
- a channel through which a liquid sample of a material can flow, thus enabling periodic testing of a stream of the liquid; and
- a sample plate thru which light may pass, the sample plate comprising a first surface configured to contact the liquid sample while in the channel and a second surface opposite the first surface that is configured to accept a beam of source light such that the beam of source light travels to the sample and light emitted by the sample passes through the sample plate and emerges from the second surface.

* * * * *